(No Model.)
T. A. PURKET.
CULTIVATOR.
No. 255,669.  Patented Mar. 28, 1882.
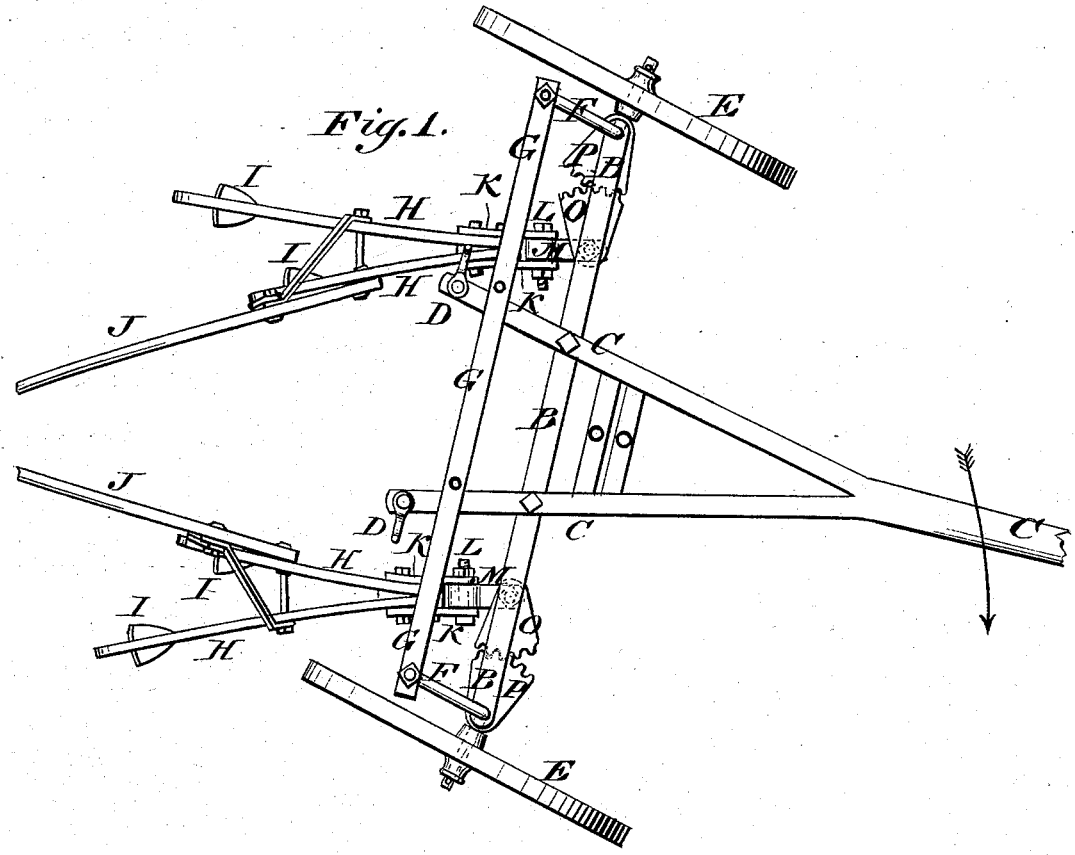
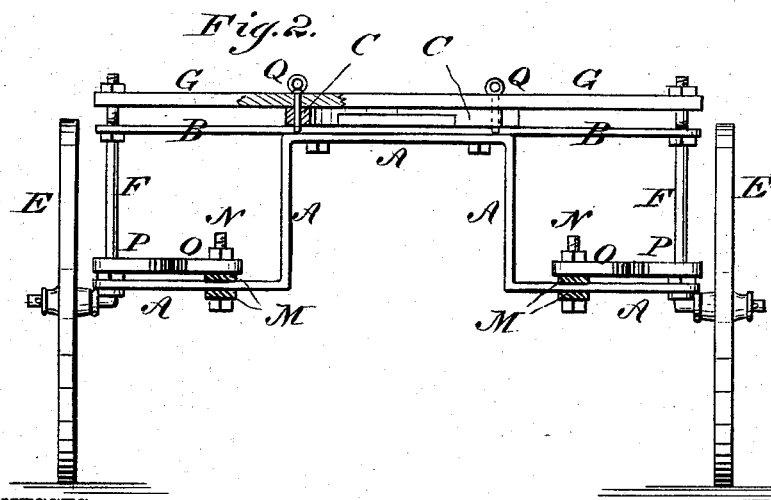
WITNESSES:
Donn P. Twitchell
C. Sedgwick
INVENTOR:
T. A. Purket
BY Munn & Co.
ATTORNEYS.

UNITED STATES PATENT OFFICE.

THOMAS A. PURKET, OF CHARLESTON, KANSAS.

CULTIVATOR.

SPECIFICATION forming part of Letters Patent No. 255,669, dated March 28, 1882.

Application filed March 24, 1881. (No model.)

To all whom it may concern:

Be it known that I, THOMAS ALLEN PURKET, of Charleston, in the county of Greenwood and State of Kansas, have invented a new Improvement in Cultivators, of which the following is a full, clear, and exact description.

Figure 1 is a plan view of my improvement. Figure 2 is a rear elevation of the same, the plow-beams being removed.

The object of this invention is to facilitate the controlling and guiding of cultivators.

The frame is formed of an arched bar, A, and a cross-bar, B, attached to the upper or middle horizontal part of the said arched bar A. The bar B is made of such a length that its ends will be directly over the ends of the arched bar A.

C is the tongue, which is forked or split, and its branches are bolted to the frame A B. The branches of the tongue C project in the rear of the frame A B and have hooks D attached to their rear ends to receive and support the plow-beams away from the ground when turning around and when passing from place to place.

E are the wheels, which revolve upon the lower crank-arms of the axles F, the upright parts of which work in bearings in the ends of the bars A B. Upon the upper ends of the upright parts of the axles F are formed crank-arms which project to the rearward at right angles with the lower crank-arms of the said axles. The ends of the upper crank-arms of the axles F are bent upward and work in bearings in the ends of the cross-bar G, which is thus just above the branches of the tongue C.

H are pairs of plow-beams, which are provided with plows I and handles J in the ordinary manner. The forward end of each pair of plow-beams H is hinged by plates K and bolts L, clevises, or other suitable means to the coupling M, which is rigidly connected with the bolt N. The bolts N work in bearings in the lower horizontal parts of the arched bar A, near their inner ends, and to the upper ends of the said bolts are rigidly attached segmental gear-wheels O, the teeth of which mesh into the teeth of segmental gear-wheels P, rigidly attached to the upright parts of the double-crank axles F. With this construction, when the team turns in following a crooked row the resistance of the plows causes the gear-segments O to turn the gear-segments P, and the movements of the gear-segments P turn the crank-axles F and cause the wheels to keep parallel with the line of draft, so that the plows will follow the line of draft and will thus be easily guided.

If desired, pins Q can be inserted in holes in the cross-bar G and in the branches of the tongue C, so as to rigidly connect the various parts of the mechanism and cause the cultivator to operate as an ordinary cultivator.

I am aware that it is not broadly new to use wheel-spindles vertically swiveled and adapted to be turned right and left by the handles and by levers; but

What I claim as new and of my invention is—

The combination, with axles F, swiveled in parts A B G, substantially as described, of the gears P, rigidly attached to said axles, and the gears O, connected with a pivoted beam-coupling, as shown and described.

THOMAS ALLEN PURKET.

Witnesses:
IRA C. NYE,
J. M. SEIDLE.